Aug. 17, 1937.  E. J. SCHMIDT  2,089,986
WHEEL WITH RUBBER LIKE TREAD AND METHOD OF MAKING SAME
Filed Dec. 4, 1933  2 Sheets-Sheet 1
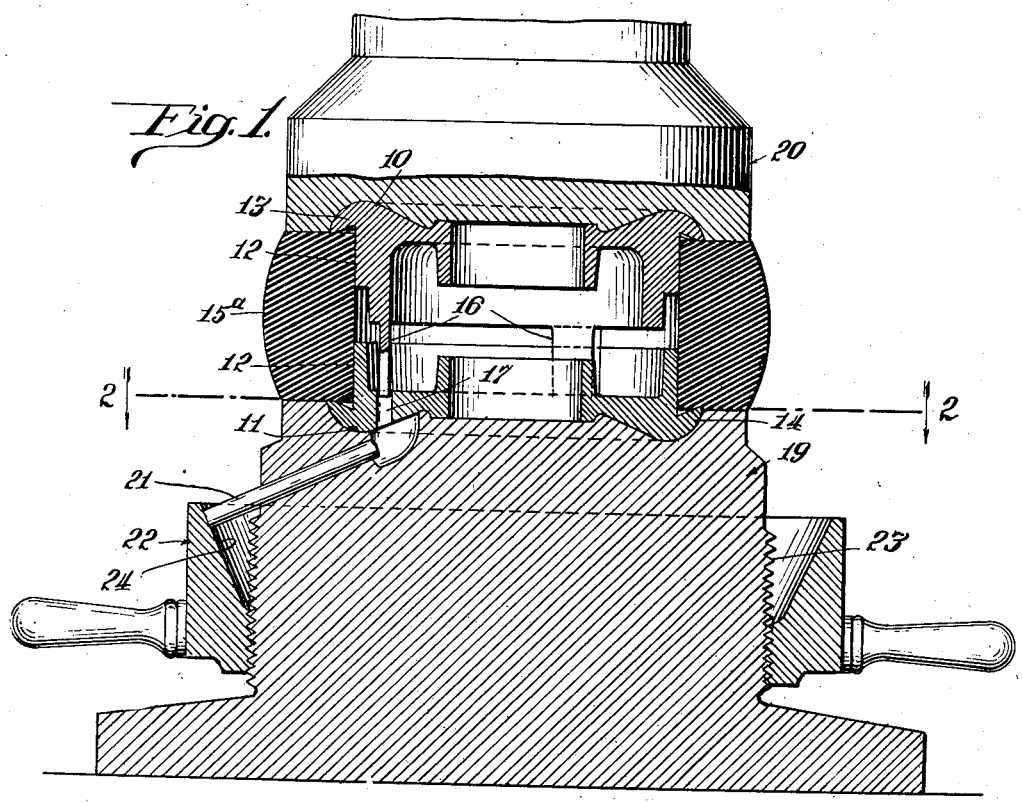
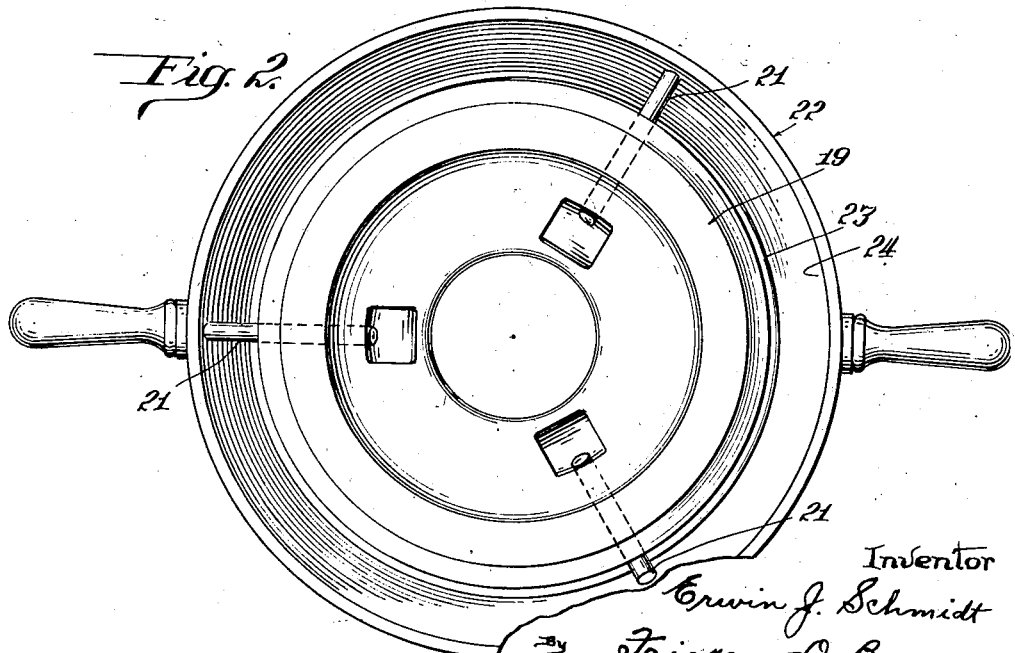
Inventor
Erwin J. Schmidt
By Fricke & DeBusk
Attorneys

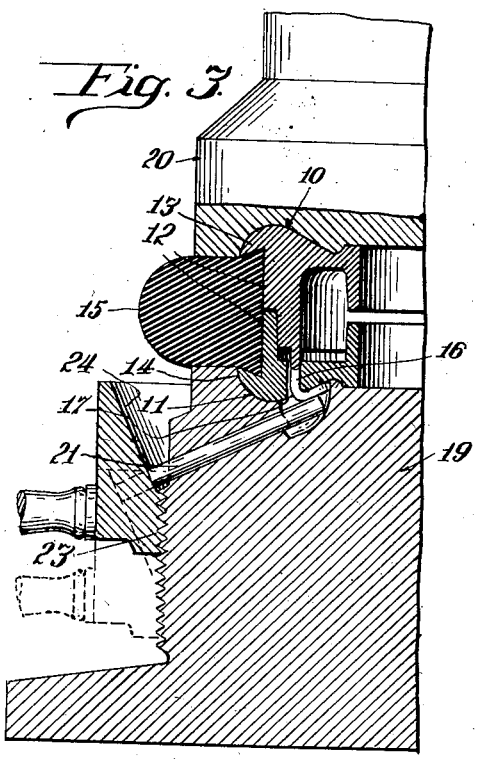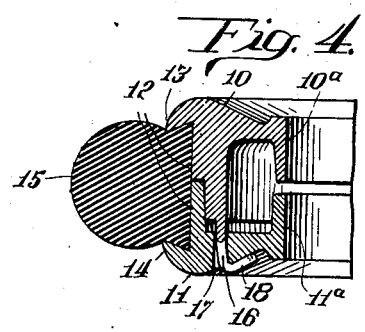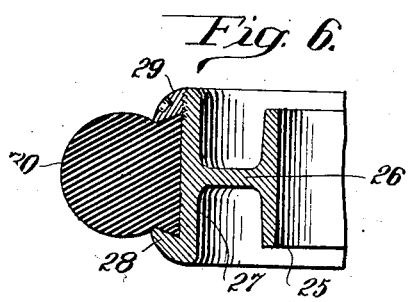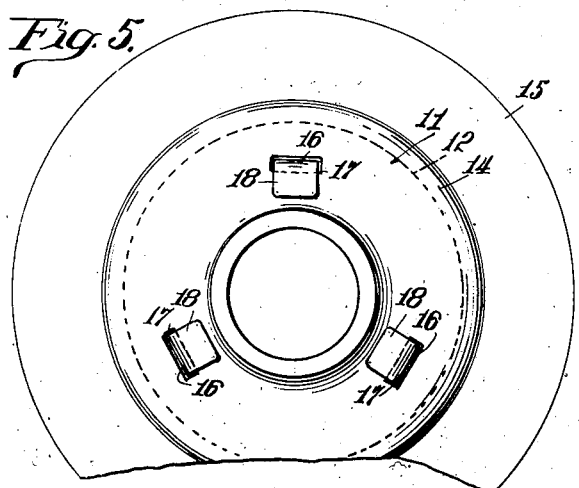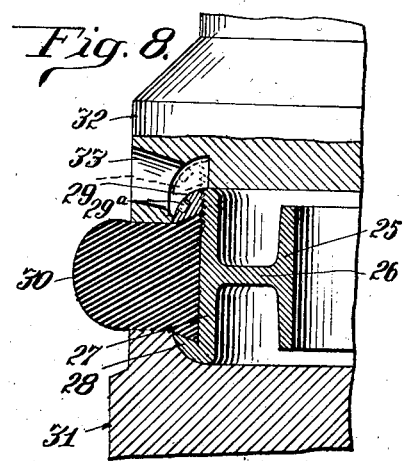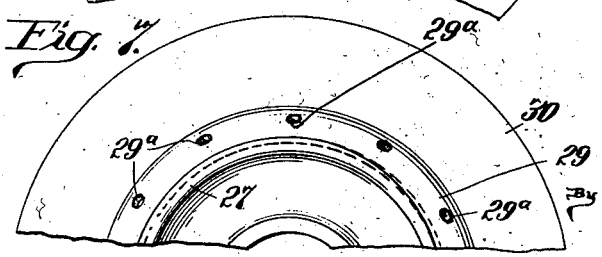

Patented Aug. 17, 1937

2,089,986

UNITED STATES PATENT OFFICE 2,089,986

WHEEL WITH RUBBER-LIKE TREAD AND METHOD OF MAKING SAME

Erwin J. Schmidt, Chicago, Ill., assignor to Allied Engineering Company, Chicago, Ill., a corporation of Illinois Application December 4, 1933, Serial No. 700,869

10 Claims. (Cl. 29—159.01)

My invention relates to improvements in wheels having treads of a compressed soft material such as rubber and to certain novel methods of making the same.

One of the objects of my invention is to provide an improved and inexpensive wheel adapted for use on such articles or vehicles as, for example, roller skates, toy wagons, warehouse and baggage trucks, and having a tread of yieldable material adapted to cushion the load on the wheel against shocks or jolts due to the wheel passing over hard, rough or uneven surfaces, to minimize slippage of the wheel when passing over smooth surfaces and when the vehicle on which it is mounted is being propelled, and to enable the wheel to operate with little or no noise even when turning at fairly high speed.

A further object of my invention is to provide a wheel having a yieldable tread which is mounted on the wheel rim in such manner that the mounting or base portion of the tread is substantially compressed and effectively clamped and held against any creepage or slippage, circumferentially or otherwise, with respect to the rim.

A more specific object of my invention is to provide an improved wheel construction wherein the mounting or base portion of a band of soft rubber-like material is compressed to a relatively narrow width and held securely under compression on the rim of the wheel between the rim flanges so that the band will serve effectively as the tread of the wheel.

It is another object of my invention to provide certain improved and inexpensive methods of making wheels as aforesaid including the application of pressure to opposite sides of the band of soft rubber-like material intended to form the tread of the wheel and then bringing into cooperative relation and securing together the parts forming the wheel trim thus holding the mounting or base portion of the tread under compression.

The invention consists in the novel constructions, arrangements and devices to be hereinafter described and claimed for carrying out the above stated objects and such other objects as will appear from the following specification, and it consists further in the improved methods of making wheels of the type mentioned to be hereinafter described and claimed.

The invention is illustrated in certain preferred embodiments in the accompanying drawings wherein:—

Fig. 1 is a longitudinal sectional view of an apparatus suitable for assembling the parts of my novel wheel according to one of my improved methods;

Fig. 2 is a transverse sectional view taken on the line 2—2 of Fig. 1;

Fig. 3 is a longitudinal sectional view of a portion of the apparatus shown in Fig. 1, with certain of the parts in changed position;

Fig. 4 is a sectional view of a fragmentary portion of a wheel embodying my invention;

Fig. 5 is a side elevational view of the construction shown in Fig. 4;

Fig. 6 is a sectional view of a fragmentary portion of a wheel of modified construction also embodying my improvements;

Fig. 7 is a side elevational view of a portion of the construction shown in Fig. 6; and Fig. 8 is a longitudinal sectional view of a portion of the apparatus which may be employed to assemble the parts of the construction shown in Figs. 6 and 7.

Like characters of reference designate like parts in the several views.

Referring first to Figs. 4 and 5, it will be noted that my improved wheel as therein shown comprises two disc-like parts 10 and 11 which, upon being inter-fitted and secured together, form the frame of the wheel. The two wheel frame parts are formed so as to provide a supporting structure in the form of a sleeve or rim 12, flanges 13 and 14 being provided on the respective wheel frame parts at the sides of said rim. The construction is such that the wheel frame is split circumferentially into the parts 10 and 11, said parts being movable axially to and from each other. A band of compressed soft rubber-like material is positioned on the wheel rim between the flanges 13 and 14, thereby serving as the tread 15 of the wheel. Preferably the flanges 13 and 14 are undercut on their inner sides, as shown in Fig. 4, to hold more securely the compressed mounting or base portion of the tread tightly against the wheel rim. As an inexpensive way of locking the two wheel frame parts together, I preferably provide, on one of the frame parts, for example, the part 10, a plurality of spaced lugs 16 which are adapted to project through openings 17 provided in the other wheel frame part, namely, the part 11, the extremities of said lugs being bent over against the outer face of the frame part 11, as shown at 18. The parts 10 and 11 are formed so as to provide the respective aligned hub portions 10a and 11a in which any suitable ball or roller bearing for the axle of the wheel may be mounted.

The parts forming the wheel construction just described may be assembled by means of the apparatus shown in Figs. 1, 2 and 3, which comprises a stationary base or supporting member 19 which is recessed on its upper side so as to provide a seat conforming in shape to the outer side of the wheel frame part 11. A reciprocating pressure applying member 20 is recessed in its under side so as to conform in shape to the outer side of the wheel frame part 10. In assembling the parts of the wheel, the member 20 is raised sufficiently to permit the wheel frame part 11 to be placed in its seat in the stationary member 19. A band 15a of soft rubber-like material, which is to form the tread of the wheel, is then slipped over the rim portion 12 of the part 11. The wheel frame part 10 is then brought into position with the rim portion 12 thereof extending into said band. Pressure is then applied to the member 20 sufficiently to move the wheel part 10 from the position shown in Fig. 1 to the position shown in Fig. 3, the band 15a of the soft rubber-like material being simultaneously and substantially compressed to a relatively narrow width as shown in Fig. 3. When the parts are in the position shown in Fig. 3, the lugs 16 of the frame part 10 extend through the respective openings 17 provided in the frame part 11 as shown in dotted lines in said figure. The mechanism for bending over the extremities of the several lugs 16 against the outer face of the frame part 11 comprises plungers 21 slidably mounted in the stationary base member 19. By turning the band 22 so that it will climb the threads 23 on the member 19, the several plungers 21 are simultaneously forced inwardly from the position shown in full lines in Fig. 1, or the dotted line position of Fig. 3, to the full line position of Fig. 3, due to the action of the cam 24 which bears against the outer ends of the plungers. The extremities of the several lugs 16 are thus forced from the dotted line position shown in Fig. 3 to the bent over position shown in full lines in said figure, and as is also shown in Figs. 4 and 5. The pressure applying members 19 and 20 may now be separated and the wheel removed. If desired the wheel may be placed in a lathe and the tread of compressed rubber-like material may be trimmed to the shape shown in Fig. 4, or any other desired shape, by means of any suitable tool.

In the modified wheel construction shown in Figs. 6 and 7, the wheel frame comprises a hub portion 25, a web portion 26, a rim portion 27 in the form of a sleeve, an undercut flange portion 28 integrally formed with the rim, and an undercut removable ring or flange 29 which has threaded engagement with the rim. A tread 30 of compressed soft rubber-like material is mounted on the rim 27 and held thereon by compression by the flanges 28 and 29.

The apparatus shown in Fig. 8 may be employed for assembling the parts of the construction last described. Said apparatus comprises a stationary base 31, the upper side of which is recessed to conform to the flange 28 so as to provide a seat for the wheel frame. A reciprocating member 32 cooperates with the member 31 to apply pressure as may be required to the opposite sides of the band of soft rubber-like material which is used for the tread 30 of the wheel. In assembling the wheel parts, the wheel frame is seated in the base member 31, the band of soft rubber-like material is positioned around the rim 27, the ring or flange 29 is loosely positioned over said band, and then the member 32 is lowered into the full pressure applying position. The ring 29 is provided with a number of small pockets or recesses 29a. By the insertion of a suitable tool, such as a small punch, through the opening 33, provided in the member 32, the ring 29 may be turned and worked down on the threads of the rim 27, that is to say, moved from the dotted line position to the full line position shown in Fig. 8. To facilitate easy final positioning of the ring 29 on the rim 27, the tread 30 may be compressed sufficiently to free it entirely of the ring when in its final position. Upon withdrawing or lifting the member 32 the tread springs back and the mounting or base portion thereof is tightly held between the undercut portions of the flanges 28 and 29.

It will be obvious that the apparatus shown in Fig. 8 may be used to remove a worn out tread on a wheel of the construction shown in Figs. 6 and 7 and to substitute therefor a new tread. When an old tread is to be removed, the wheel is placed in position on the part 31 and the part 32 is brought down sufficiently to force the tread out of engagement with the ring or flange 29 and the latter is then worked backwardly off the rim 27. The members 31 and 32 are then separated and the old tread removed, a new band of soft rubber-like material being then slipped on the irm 27 in its place. Pressure is then applied to the band and the ring or flange 29 is again screwed into place in the manner heretofore described.

In each form of my invention, the supporting rim and the cooperating side flanges associated therewith provide an outwardly open, circumferentially extending channel of uniform size and shape for the base or mounting portion of the tread, the inner sides of the channel being convergently disposed with respect to each other. The aforesaid channel is free of anything which might interfere with or prevent freedom of movement of the tread material which takes place continually as the wheel rolls over uneven surfaces under the pressure of the load carried thereby and is subjected to the other forces encountered when in service. In my construction, the outer portion of the tread material has freedom with respect to yielding and return movements and the compression conditions therein are substantially uniform circumferentially thereof, resulting in substantially uniform wear on the tread at all points and the absence of any noticeable flat spots in the tread during its period of service. The distance between the flanges at their outer diameter is less than that between them at their inner diameter or at the rim and the compression on a tread of the shape such as that shown in Fig. 1 is greater, therefore, between the outer portions of the flanges than at the rim. In compressing and securing the tread in place between the flanges, the thickness of the tread (axially) is substantially reduced and its diameter is substantially increased as is clearly evident by a comparison of Figs. 1, 3 and 4. The outer portion of the tread, therefore, is expanded and stretched circumferentially in the making of a wheel with the result that in the completed wheel the outer portion of the tread exerts substantial pressure inwardly on the inner or mounting portion thereof all of which aids in holding the tread against radial and circumferential creepage and yet permits of the necessary freedom of movement of the material in the outer portion of the tread under service conditions.

Any suitable soft rubber-like material may be employed for the tread of my improved wheel. Fabric such as that commonly employed in buffing wheels of various descriptions may be used for some purposes. A composition material of soft rubber and fabric may be employed if desired. For wheels intended to be used on such articles as roller skates, I prefer to employ a good grade of commercial soft rubber such, for example, as that used in the better grade of rubber heels for shoes. I have found that a band of such soft rubber-like material, having its mounting or base portion relatively wide as compared with the wheel rim when unrestrained, when compressed in the manner I have described will be securely held on the wheel rim, under all conditions encountered in ordinary use, against any radial movement and also against any creepage circumferentially of the wheel. The extent to which the base portion of the soft rubber-like material is to be compressed will depend to some extent at least on the use to which the wheels are to to be put. It will be obvious that the tread of a wheel for a roller skate for a child weighing 100 pounds need not be compressed nearly so much as that of a wheel for a warehouse truck, for example, which is designed to carry a load many times greater.

Wheels embodying the principles of my construction may be employed for a wide variety of uses. In addition to roller skates and warehouse trucks which I have just mentioned, my construction readily lends itself to casters of all sorts, wheels for baby carriages, wheel chairs, and trucks of various descriptions.

My improved wheels have been found to be especially well adapted for use on roller skates. The treads on the wheels yield under the weight of the child on the skate sufficiently to provide an effective cushion against the numerous shocks or jolts to which such wheels are subjected as when skating over an uneven surface such as a brick pavement or when passing over the expansion joints of a concrete sidewalk. Wheels having treads as described greatly minimize slippage, even when passing over smooth surfaces, as for example, when turning a sharp corner on a skating rink. The wheels take a secure grip on the skating surface and there is practically no lost-motion by slippage of the wheels on said surface when skating over it. The skater's speed can be greatly increased without additional effort over what it would be with wheels of a hard rubber composition or of steel. The wheels roll silently, the cushion tread creating no noise when making rolling contact with the surface skated over. When the treads are made of a good grade of commercial soft rubber, such as that used in rubber heels, they are very efficient in use and have wearing qualities comparable to those of rubber heels on shoes.

I do not intend to limit my invention to the details of construction shown and described except only insofar as certain of the appended claims are specifically so limited as it will be obvious that modifications may be made without departing from the principles of my invention.

I claim:—

1. In a wheel of the type described, the combination of a frame having a rim and spaced circumferential flanges secured at the respective sides of the rim, said frame being split circumferentially into two parts which carry said respective flanges, one of said frame parts having a plurality of lugs which extend through openings in the other of said frame parts, said lugs upon being bent over serving to secure said frame parts together and to hold said flanges in cooperative relation and a tread of soft rubber-like material having its base portion in substantially compressed condition on said rim between said flanges, said base portion of the tread when unrestrained being substantially greater in width than the distance between said flanges.

2. In a wheel of the type described, the combination of a supporting structure, means comprising holding elements at the opposite ends of said structure, said elements having their inner faces convergently disposed outwardly with respect to each other and a tread of soft rubber-like material having its base portion held in position in substantially compressed condition on said structure between the inner faces of the holding elements, said base portion when unrestrained being substantially greater in width than the distance between said inner faces.

3. The method of making a wheel of the type herein described which comprises placing a band of soft rubber-like material on the rim of a two-part wheel frame and between flanges on the respective frame parts, applying pressure through said flanges to the opposite sides of the band to compress the same to a relatively narrow width and to project lugs on one frame part through openings in the other frame part, and then bending over the projecting ends of said lugs to secure the frame parts together and to hold the band under compression.

4. The method of making a wheel of the type described, which comprises placing a band of soft rubber-like material into position on a sleeve structure between flange members which are movable axially with respect to each other, then applying pressure on said band through said flanges for compressing the base portion of the band between the flanges and for projecting lugs carried by one of said flange members through openings in the other flange member, and then effecting an operative connection between the lugs carried by said one flange member and the other flange member for securing said members together with the base portion of the band under compression between the flanges.

5. A wheel of the type described comprising in combination a supporting structure, means comprising holding elements at the opposite ends of said structure, said elements having their inner faces convergently disposed outwardly with respect to each other, and a tread member of soft rubber-like material having the inner portion thereof in substantially compressed condition axially of said structure between the inner faces of said holding elements and having the outer portion thereof in substantially expanded and stretched condition circumferentially.

6. In a wheel of the type described for roller skates and the like; the combination of a supporting structure; means comprising holding elements at the opposite ends of said structure, said elements having their inner faces convergently disposed outwardly with respect to each other; and a tread of good grade commercial soft rubber, comparable in quality and hardness to the better rubber heels, having its base portion locked permanently in position in substantially compressed condition on said structure between the inner faces of the holding elements, said base portion when unrestrained being substantially greater in width than the distance between said inner faces.

7. In a wheel of the type described for roller skates and the like; the combination of a supporting structure; means comprising holding elements at the opposite ends of said structure, said elements having their inner faces convergently disposed outwardly with respect to each other; and a thread of good grade commercial soft rubber, comparable in quality and hardness to the better rubber heels, having its base portion constituting a minor part thereof and locked permanently in position in substantially compressed condition on said structure between the inner faces of the holding elements, said base portion when unrestrained being substantially greater in width than the distance between said inner faces.

8. In a wheel of the type described for roller skates and the like; the combination of a supporting structure; means comprising holding elements at the opposite ends of said structure, said elements having their inner faces convergently disposed outwardly with respect to each other; and a tread of good grade commercial soft rubber, comparable in quality and hardness to the better rubber heels, having its base portion constituting a minor part thereof and locked permanently in position on said structure between the inner faces of the holding elements and compressed axially to a length not greater than four-fifths of its normal unrestrained axial length.

9. In a wheel of the type described for roller skates and the like; the combination of a supporting structure; means comprising holding elements at the opposite ends of said structure, said elements having their inner faces convergently disposed outwardly with respect to each other; and a tread of good grade commercial soft rubber, comparable in quality and hardness to the better rubber heels, having its base portion constituting a minor part thereof and locked permanently in position on said structure between the inner faces of the holding elements and compressed axially to a length equal to about five-eighths of its normal unrestrained axial length.

10. In a wheel of the type described for roller skates and the like; the combination of a supporting structure; a tread of good grade commercial soft rubber, comparable in quality and hardness to the better rubber heels, on the base of said structure; and means carried by and extending radially outwardly from the base of said structure at its opposite ends for applying pressure on the side faces of the inner portion of said tread for compressing the tread axially and producing therein greater axial compression at a circumference spaced outwardly a distance from the base of said structure than is done directly at the base of said structure and serving to maintain in the outer portion at least of the tread compression conditions substantially uniform circumferentially thereof, the outer portion of the tread constituting the major part thereof and being unconfined, said tread when unrestrained being of substantially greater axial length than when compressed on said structure.

ERWIN J. SCHMIDT.